United States Patent [19]
Isella

[11] Patent Number: 5,328,255
[45] Date of Patent: Jul. 12, 1994

[54] WHEEL SLIP CONTROL SYSTEM

[75] Inventor: Thomas Isella, Markgröningen, Fed. Rep. of Germany

[73] Assignee: Robert Bosch GmbH, Stuttgart, Fed. Rep. of Germany

[21] Appl. No.: 846,998
[22] PCT Filed: Sep. 13, 1990
[86] PCT No.: PCT/EP90/01556
 § 371 Date: Apr. 2, 1992
 § 102(e) Date: Apr. 2, 1992
[87] PCT Pub. No.: WO91/04891
 PCT Pub. Date: Apr. 18, 1991

[30] Foreign Application Priority Data

Oct. 9, 1989 [DE] Fed. Rep. of Germany ....... 3933653

[51] Int. Cl.$^5$ ................................. B60T 8/24
[52] U.S. Cl. .................. 303/103; 303/113.2; 180/197; 364/426.03
[58] Field of Search ............... 303/113.1, 113.2, 113.4, 303/113.5, 103, 106, 111; 180/197; 364/426.01–426.03

[56] References Cited

U.S. PATENT DOCUMENTS

| | | | |
|---|---|---|---|
| 4,511,014 | 4/1985 | Makita | 180/197 X |
| 4,779,202 | 10/1988 | Leiber | 180/197 X |
| 4,809,808 | 3/1989 | Sommer | 180/197 |
| 4,917,208 | 4/1990 | Komoda | 180/197 |
| 4,933,856 | 6/1990 | Leiber | 180/197 X |
| 4,998,593 | 3/1991 | Karnopp et al. | 303/100 X |
| 5,051,908 | 9/1991 | Shiraishi | 180/197 X |

FOREIGN PATENT DOCUMENTS

| | | | |
|---|---|---|---|
| 465958 | 1/1992 | European Pat. Off. | 303/113.5 |
| 3611822 | 10/1986 | Fed. Rep. of Germany . | |
| 3708063 | 9/1987 | Fed. Rep. of Germany . | |
| 3736010 | 4/1988 | Fed. Rep. of Germany . | |
| 3903833 | 8/1989 | Fed. Rep. of Germany . | |
| 2591957 | 6/1987 | France . | |
| 111538 | 4/1989 | Japan | 180/197 |
| 227761 | 10/1991 | Japan | 303/113.5 |
| 246151 | 11/1991 | Japan | 303/113.5 |

Primary Examiner—Douglas C. Butler
Assistant Examiner—Alfred Muratori
Attorney, Agent, or Firm—Michael J. Striker

[57] ABSTRACT

A wheel slip control system (ABS and/or drive slip control and/or engine drag moment control system) is formed so that when vehicle motion along curvilinear path is detected the control system is switched to different permitted wheel slip values on different sides of the vehicle, in such a way that a yawing moment is created which acts counter to the yawing moment produced by the vehicle's tendency to oversteer or understeer.

3 Claims, 3 Drawing Sheets

WHEEL SLIP CONTROL SYSTEM

BACKGROUND OF THE INVENTION

The present invention relates to a wheel slip control system. It is known that there are, for example, antilocking systems, drive slip control systems or engine drag moment control systems which avoid the excessive wheel slippage caused, under certain road surfaces,. by braking too hard, or excessive or insufficient driving torque. In the case of these systems, in addition to the other control criteria, the wheel slip may be determined and compared with a limit value. If the limit value is exceeded, then the brake pressure is reduced or increased, and if necessary the engine torque is reduced or increased.

Some vehicles have a tendency when cornering to understeer or to oversteer. This feature is intensified by greater wheel slip, i.e. on cornering, and with the control system running, the feature occurs in an intensified manner.

SUMMARY OF THE INVENTION

Accordingly, it is an object of the present invention to provide a wheel slip control system which avoids the disadvantages of the prior art.

In keeping with these objects and with others which will become apparent hereinafter, one feature of the present invention resides, briefly stated, in a wheel slip control system which has a bend recognition device detecting a bend and sending a signal to an evaluation circuit, and through this signal the control system is switched over to different permitted slippage values on two sides of the vehicle so that the yawing moment is created to counteract the yawing moment created by the tendency of the vehicle to oversteer or understeer.

When the wheel slip control system is designed in accordance with the present invention, a yawing moment is artificially created which is dependent on the vehicle type and which works to counteract the specific tendency (oversteering or understeering) of the vehicle. By this means, the driving stability is increased.

The invention is based on the characteristic of the $\mu$-slip curve, i.e. on the relationship of the friction force between the tires and the road surface as a function of the wheel slip Through wheel slip control systems such as ABS, drive slip control or engine drag moment control, the operating point on the $\mu$-slip curve can be determined individually for each wheel via the setting of limit values for the wheel slip (slip thresholds). In the case of the drive slip control and engine drag moment control function, a system with active brake engagement on the driving wheels would be necessary for this, i.e. it requires the application of pressure. The respective control system now tries to adjust each wheel to the specified limit value. Since in the case of the aforementioned slip control systems, usually relatively low slip values are set in order to maintain driving stability (lateral guidance), it can be assumed that the operating point is to be found in the steeply rising range (almost linear rise) of the $\mu$-slip curve. Thus the driving or braking force transferred in this range is approximately proportional to the set slip.

Through the slip being set differently on the right and left sides of the vehicle, and the differing braking or driving forces resulting from this, a yawing moment can be created. Used purposefully, this yawing moment can counteract or completely cancel out any tendency to oversteer or to understeer on. cornering (motion of rotation around the vertical axis of the vehicle).

Here, the increase in driving stability is not associated with a loss of capacity for acceleration or deceleration if a reduction in slip on one side of the vehicle is opposed by an increase on the other side. However, an increase in slip means an increase in the transmitted power, so long as the operating point is in the rising range of the $\mu$-slip curve. For the total of both wheels, the lateral guiding force remains approximately constant.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
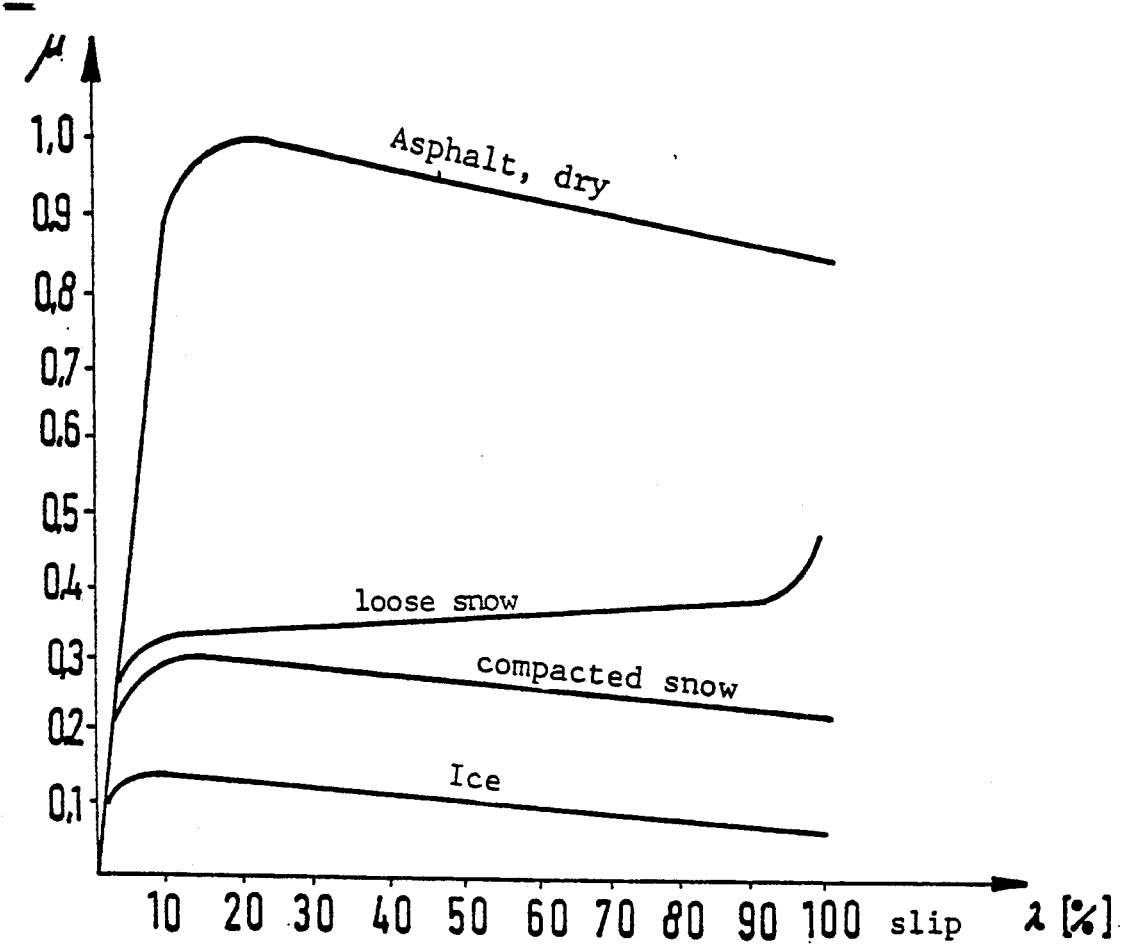
FIG. 1 is a graphical illustration of the relationship of friction force between tires and the road surface and wheel slip, i.e. a u-slip curves, for different road surfaces, FIG. 2-4 one schematic vehicle representations to explain the effect of the wheel slip system according to this invention, FIG. 5 a block diagram of a controller for the wheel slip according to the invention.
Figure 2:
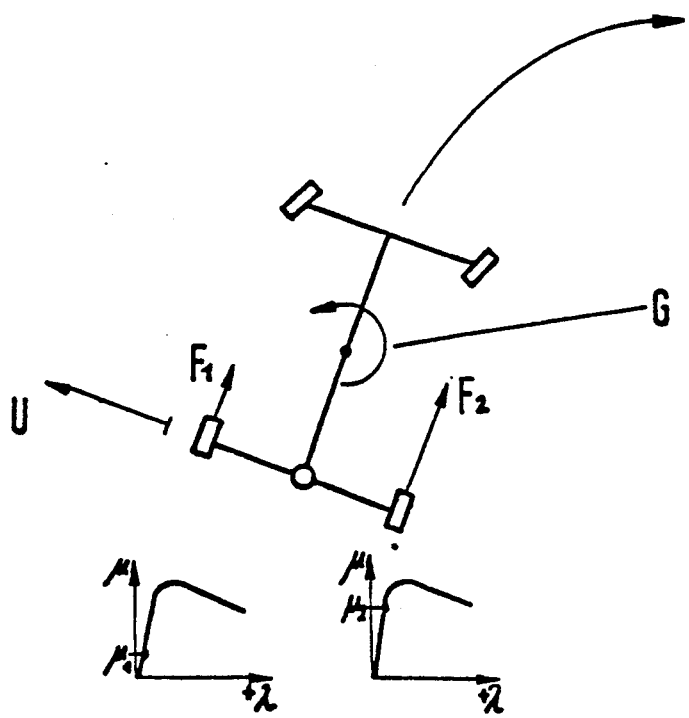

The embodiment whose effect is shown in FIG. 2, is a vehicle with rear drive, fitted with drive slip control, with the drive slip control being effective, and which is driving in a curve.

Vehicle nonlinear motion recognition is effected, for example, via the speed difference of the front wheels, or with the aid of a transverse acceleration sensor or a steering angle sensor. With the aid of the rear wheel brake, the wheel on the inside of the curved motion path is now adjusted to a higher slip limit value than the wheel on the outside of the curved motion path. Due to the different driving forces ($F_1$, $F_2$), a yawing moment arises, which counteracts U, this vehicle's usual tendency to oversteer in this driving situation. The lateral guiding force is increased at the wheel on the outside of the curved motion path, and reduced at the wheel on the inside of the curved motion path, so that in total, it remains approximately constant.

Figure 3:
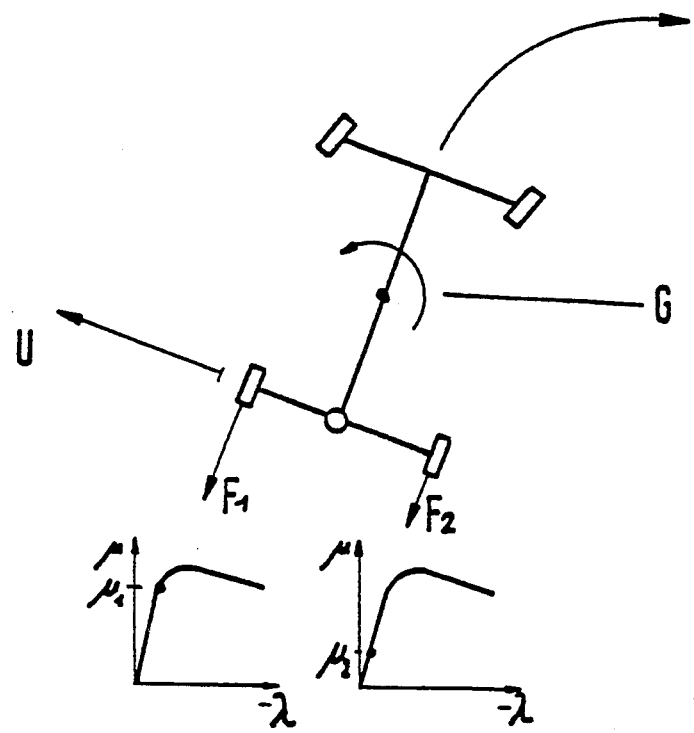

In the embodiment whose effect is in FIG. 3, the vehicle is driving around a curve, and has a controlling engine drag moment controller and rear wheel drive.

Curved motion path recognition takes place as described above. Both driving wheels are in a state of drag slip (wheel slip through engine drag moment).

Through the engine engaging (active acceleration) and simultaneous active brake engagement at the rear wheel on the outside of the curve, wheel slip is maintained at the rear wheel on the outside of the curve, and slip=0 (or slight drive slip) is set at the rear wheel on the inside of the curve. By this means, due to the different forces $F_1$ and $F_2$, a yawing moment around the vertical axis is produced, which stabilizes the oversteering vehicle. As in FIG. 2, each of the driven wheels is assigned a μ-slip curve, and the operating points are shown.

Figure 4:
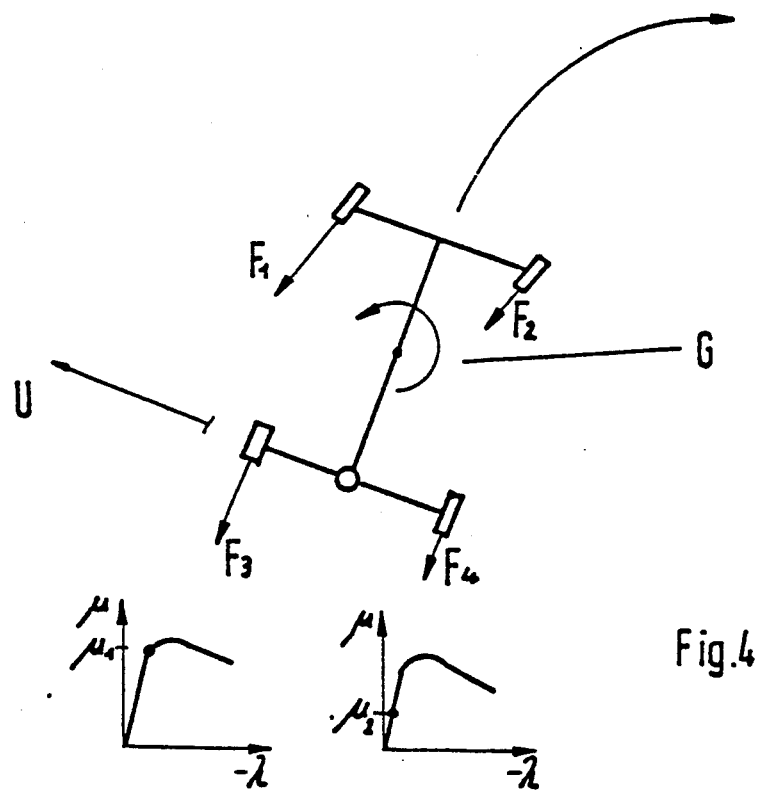

In the embodiment whose effect is in FIG. 4, the engagement of an ABS system during braking, while driving along a curvilinear motion path, is assumed.

Here too, vehicle curvilinear motion recognition takes place as described above. Through a higher braking slip of the front and rear wheels on the outside of the curved motion path, or preferably only of the front wheel, a corresponding yawing moment can be created, which stabilises an oversteering vehicle.

The advantages of the invention include in the reduction of yawing movements of the vehicle in ABS controlled braking in vehicle curvilinear motion, with unchanged braking distance.

reduction of the yawing movement (oversteering) in the drive slip control mode of rear driven vehicles in vehicle curvilinear motion, with unchanged traction.

reduction of the yawing movement in the engine drag moment control mode of rear driven vehicles in vehicle curvilinear motion with unchanged retardation.

Figure 5:
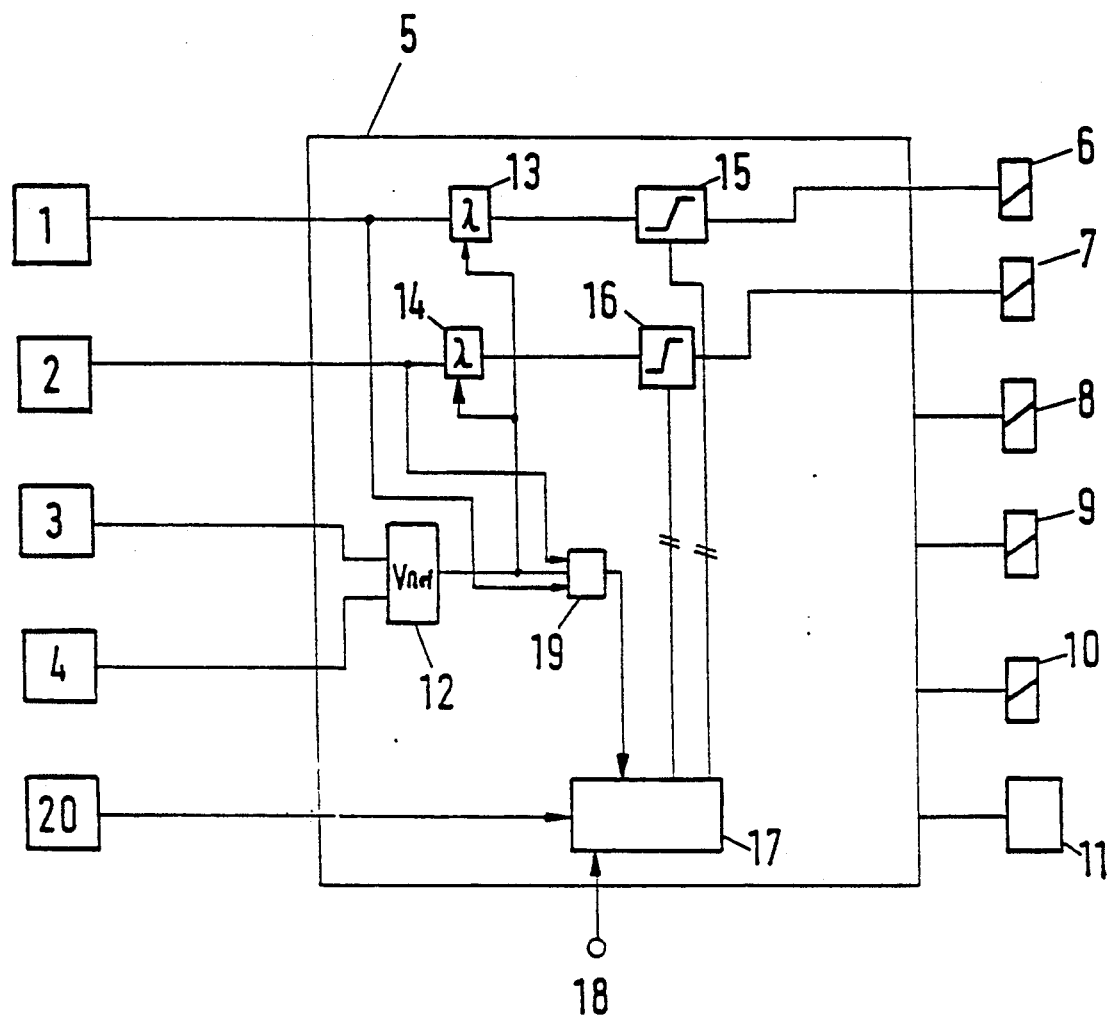

The invention is explained in more detail on the basis of the block diagram in FIG. 5. In FIG. 5, an ABS, a drive slip control system and a engine drag moment control system should be present. Wheel speed sensors 1 to 4, assigned to the four wheels, are provided. Their signals are fed to an evaluation circuit 5. This creates control signals for the brake pressure control valves 6 to 9 in the case of an ABS. Control signals for the brake pressure control valves 6 and 7 assigned to the driven wheels, as well as for a pressure control valve 10 and possibly for an actuator 11 in the case of a drive slip control system; and control signals for the actuator 11 in the case of a engine drag moment control system. On the basis of FIG. 5, only those slip signals created at too high a wheel slip at the driven wheels will be described in more detail. From the wheel speed signals of the non-driven wheels 3 and 4, a reference quantity $V_{Ref}$ approximating to the vehicle speed is formed in a block 12. This reference quantity is processed with the signals of the speed sensors 1 and 2, in slippage formers 13 and 14, into slip signals. Comparators 15 and 16 transmit a signal if there is a shortfall or overstepping of the set threshold values.

In the case of an ABS, which is recognised by block 17 when wheel slip is present ($V_{Ref} > V_R$; signal from comparator 19), the same wheel slip limit values are specified for the comparators 15 and 16. A similar event occurs in the other channels.

In the case of a drive slip control system, which is recognised by block 17 through the state of drive slip ($V_{Ref} < V_R$) and possibly no braking (no signal to terminal 18), drive slip limit values of the same size are also transmitted for the comparators 15 and 16. In certain circumstances the actuator 11 can also be operated.

In the case of an engine drag moment control system, which is recognised by block 17 through the state of wheel slip ($V_{Ref} > R_R$) and possibly no braking, the actuator 11 is operated (not shown).

If the vehicle now drives along a curvilinear motion path sensor 20 indicates this; block 17 is also informed as to whether it is a left or right-hand bend. If this signal is present, then in the ABS case, in accordance with FIG. 41, the thresholds in the comparators 15 and 16 (and accordingly in the channels not shown), depending on whether it is a left or right-hand curve and whether the vehicle oversteers or understeers (rear drive or front drive), will be set at different values.

in the case of a drive slip control system, in accordance with FIG. 2, the thresholds in the comparators 15 and 16, likewise depending on the direction of the curve (and possibly on the vehicle characteristics), will be set at different values.

in the case of an engine drag moment control system, the valves 6, 7 and 10 will be operated to effect a pressure increase, and the limit values of the comparators 15 and 16 will be set differently, depending on the direction of the curve (and possibly on the vehicle characteristics).

It will be understood that each of the elements described above, or two or more together, may also find a useful application in other types of constructions differing from the types described above.

While the invention has been illustrated and described as embodied in a wheel slip control system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An antilocking brake control system for a vehicle having wheels, consisting of:
   sensing means (1 to 4) for determining a vehicle wheel speed of each of said vehicle wheels and for producing vehicle wheel speed signals for each of said wheels according to said vehicle wheel speeds;
   means (12) for producing a vehicle speed signal ($V_{Ref}$) characteristic of a vehicle speed connected to said sensing means for said wheels to receive vehicle wheel speed signals and to determine said vehicle speed from said vehicle wheel speeds;
   means (13, 14) for determining wheel slip values for said wheels from said vehicle wheel speed signals and said vehicle speed signal, said means for determining wheel slip values being connected to said sensing means (1 to 4) for said wheels and said means for producing a vehicle speed signal (12) to receive said vehicle speed signal therefrom;
   comparison means (15, 16) for comparing said wheel slip value at each of said wheels with a wheel slip value limit, said comparison means being connected with said means (13, 14) for determining wheel slip values to receive said wheel slip values therefrom;
   means for varying a braking force at each of said wheels and hence a wheel slip value at each of said wheels within said wheel slip value limit;
   curvilinear vehicle motion detection means (20) for detecting a curvilinear vehicle motion and for producing a curvilinear vehicle motion signal; and
   a brake control system (17) connected to said curvilinear vehicle motion detection means to receive said curvilinear vehicle motion signal and to means (19) for generating a recognition signal when said vehicle speed is greater than one of said vehicle wheel speeds, and containing means for setting said wheel slip value limit of said comparison means according to said curvilinear vehicle motion signal, and said recognition signal so that, when curvilinear motion of said vehicle and said recognition signal are detected, the wheel slip value limits for wheels on different sides of the vehicle are set to different values in such a way that a yawing moment is created so as to counteract a tendency to oversteer or understeer.

2. A drive slip control system for a vehicle including two driven wheels and two nondriven wheels, consisting of:

sensing means (1 to 4) for determining a vehicle wheel speed of each of said vehicle wheels and for producing vehicle wheel speed signals for each of said wheels according to said vehicle wheel speeds;

means (12) for producing a vehicle speed signal characteristic of a vehicle speed connected to said sensing means (3, 4) for said nondriven wheels to receive said vehicle wheel speed signals for said nondriven wheels therefrom and to determine said vehicle speed from said vehicle wheel speeds for said nondriven wheels;

means (13, 14) for determining wheel slip values for said driven wheels from said vehicle wheel speed signals of said driven wheels and said vehicle speed signal, said means (13, 14) for determining wheel slip values being connected to said means for producing said vehicle speed signal to receive said vehicle speed signal therefrom;

comparison means (15, 16) for comparing said wheel slip value at each of said driven wheels with a wheel slip value limit at each of said driven wheels, said comparison means (15, 16) being connected with said means (13, 14) for determining wheel slip values to receive said wheel slip values therefrom;

means (6, 7) for varying a braking force at each of said driven wheels and hence a wheel slip value at each of said wheels within said wheel slip value limit;

curvilinear vehicle motion detection means (20) for detecting a curvilinear vehicle motion and for producing a curvilinear vehicle motion signal; and a drive slip control system (17) connected to said curvilinear vehicle motion detection means and to means (19) for generating a recognition signal when said vehicle speed is greater than one of said wheel speeds to receive said curvilinear vehicle motion signal and said recognition signal, and containing means for setting a wheel slip value limit of said comparison means at each of said driven wheels according to said curvilinear vehicle motion signal, and said recognition signal so that, when curvilinear motion of said vehicle and said recognition signal are detected, the wheel slip value limits for said driven wheels on different sides of the vehicle are set to different values in such a way that a yawing moment is created which counteracts a tendency to oversteer or understeer.

3. A drive slip control system according to claim 2, including engine moment control means for reducing a wheel slip created by an engine moment by decreasing said engine moment, said engine moment control means including an actuator connected with said drive slip control system.

* * * * *